United States Patent [19]
Richter

[11] 4,155,148
[45] May 22, 1979

[54] TENTERING CLIP

[75] Inventor: Hans H. Richter, Warwick, R.I.

[73] Assignee: Marshall and Williams Company, Providence, R.I.

[21] Appl. No.: 853,277

[22] Filed: Nov. 21, 1977

[51] Int. Cl.² .............................................. D06C 3/04
[52] U.S. Cl. ...................................................... 26/94
[58] Field of Search ................................ 26/93, 94, 95

[56] References Cited

U.S. PATENT DOCUMENTS

| | | | |
|---|---|---|---|
| 597,996 | 1/1898 | Mather | 26/93 |
| 616,390 | 12/1898 | Arnold | 26/93 X |
| 1,858,502 | 5/1932 | Hinnekens | 26/93 |

Primary Examiner—Robert Mackey
Attorney, Agent, or Firm—William Frederick Werner

[57] ABSTRACT

This invention relates to a gate type tentering clip with pivotally mounted jaw in which the jaw is provided with a new and novel pivoting movement.

3 Claims, 18 Drawing Figures

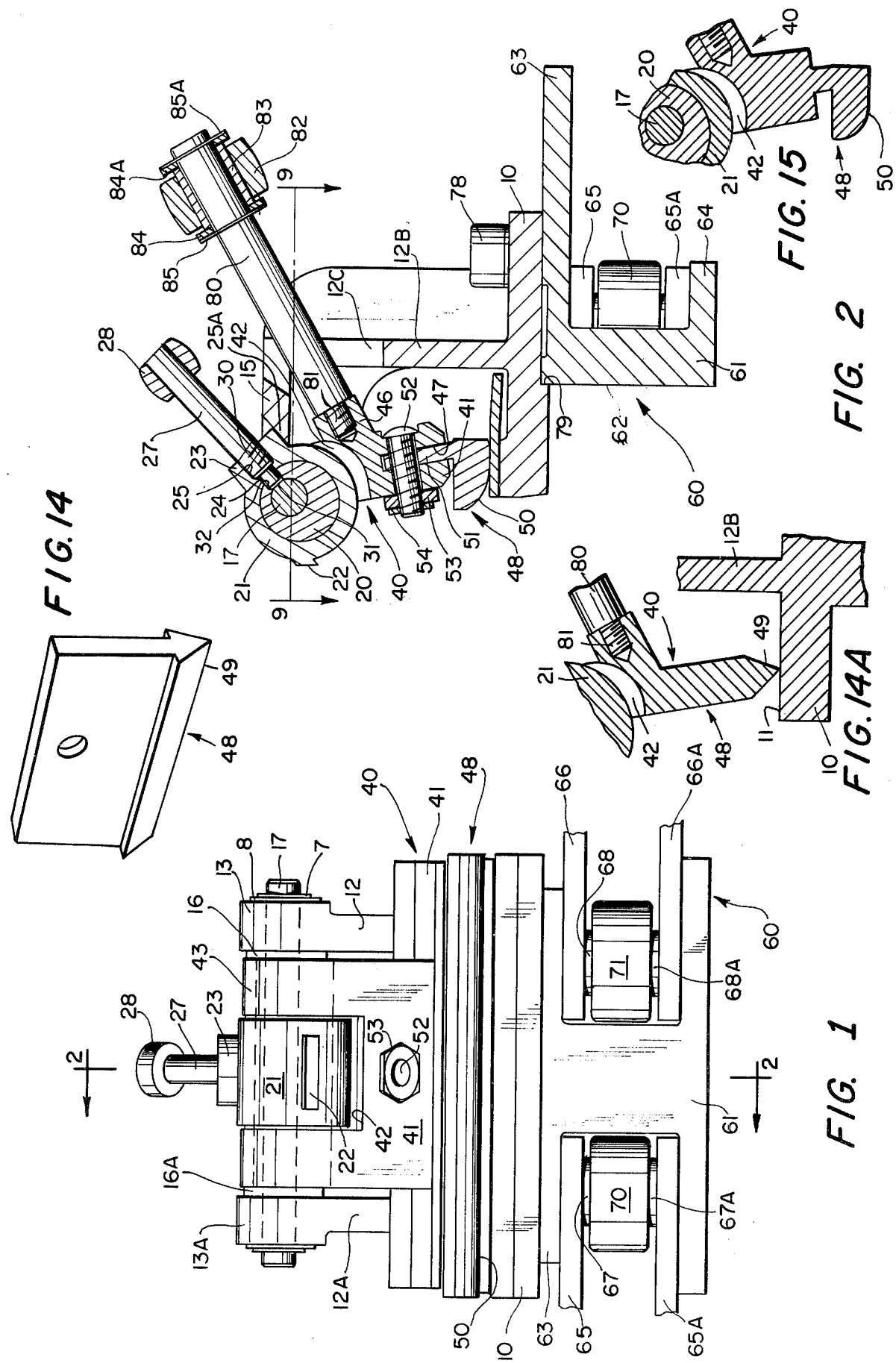

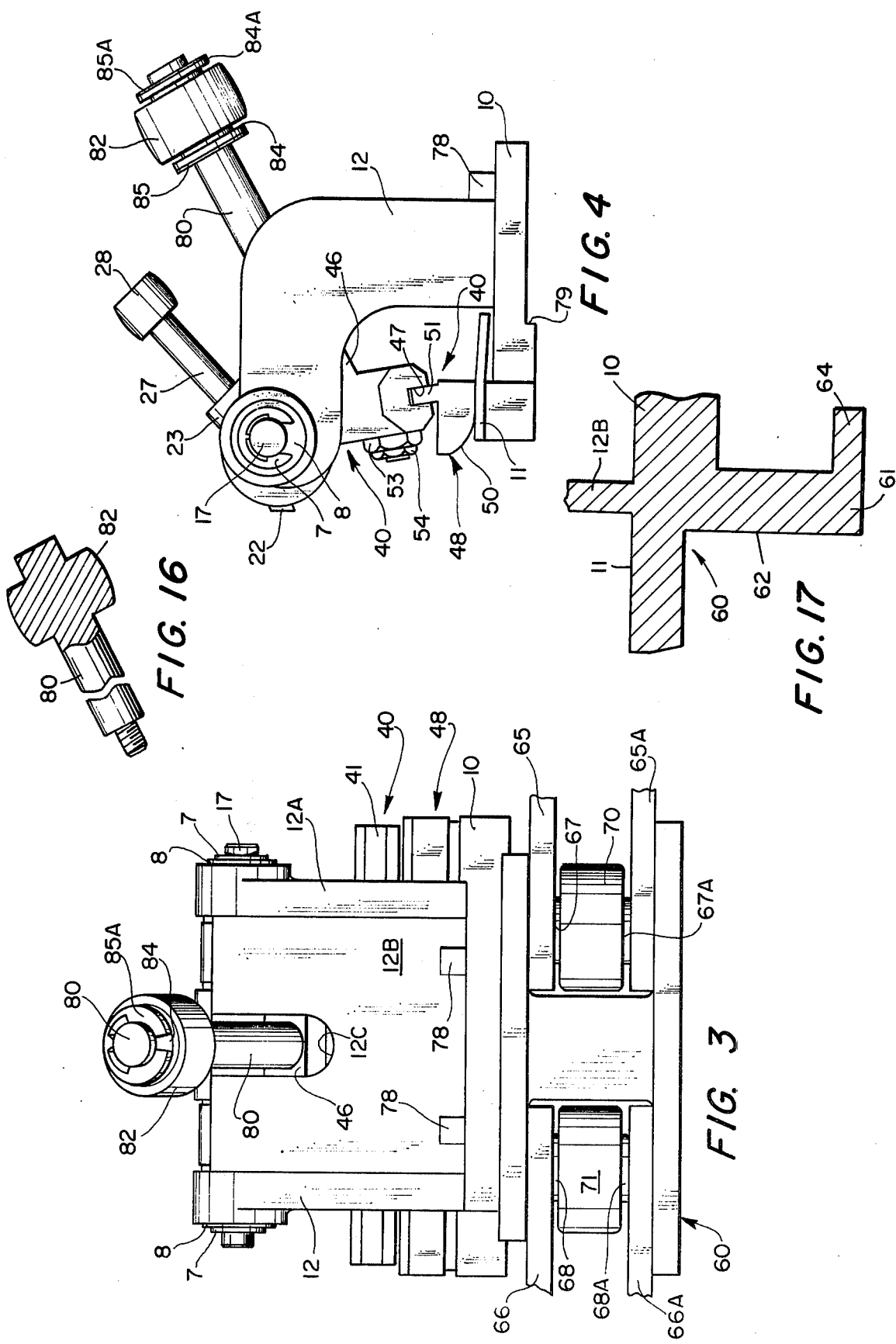

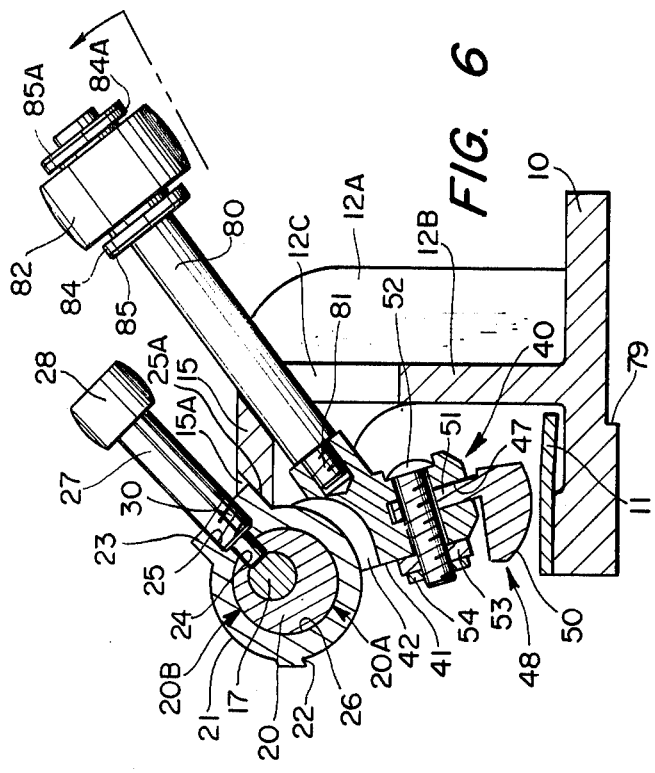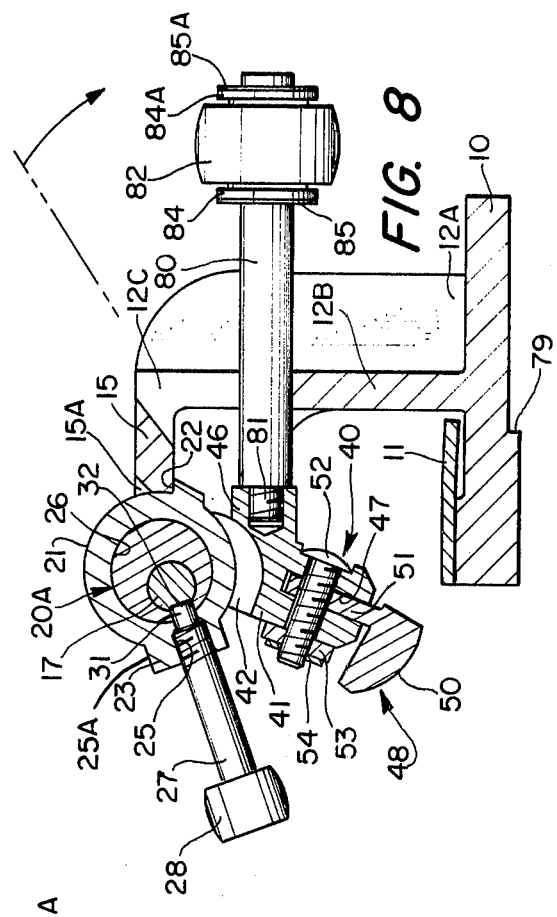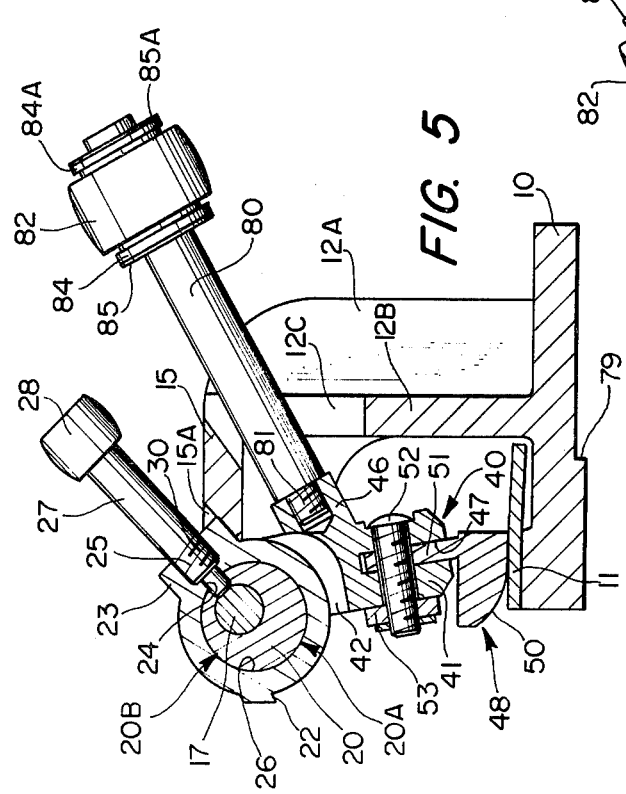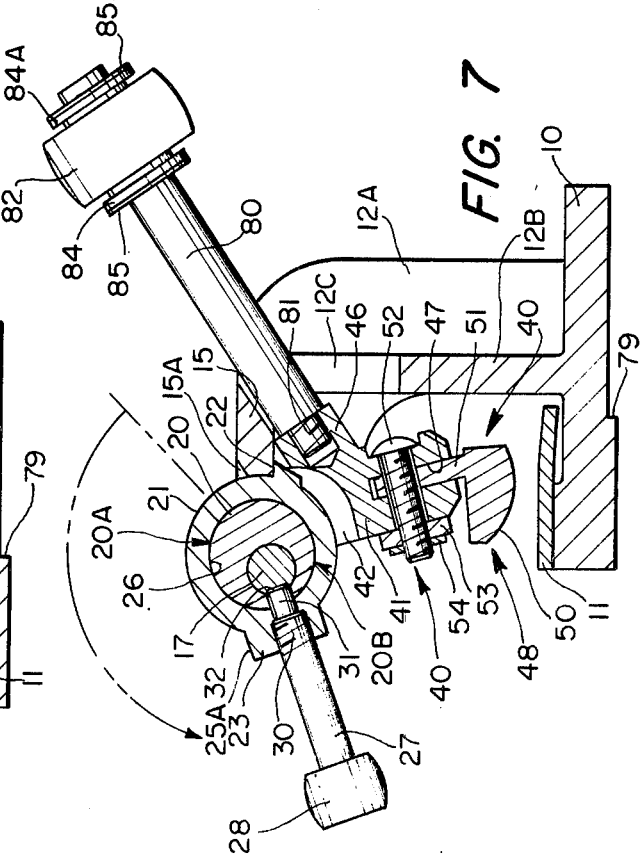

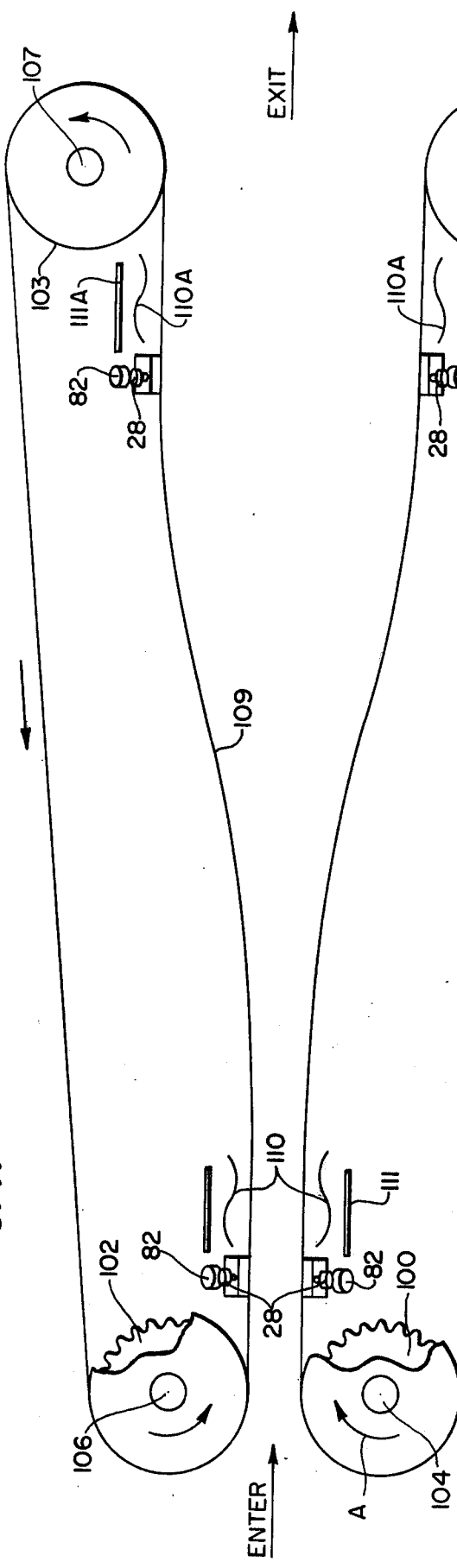
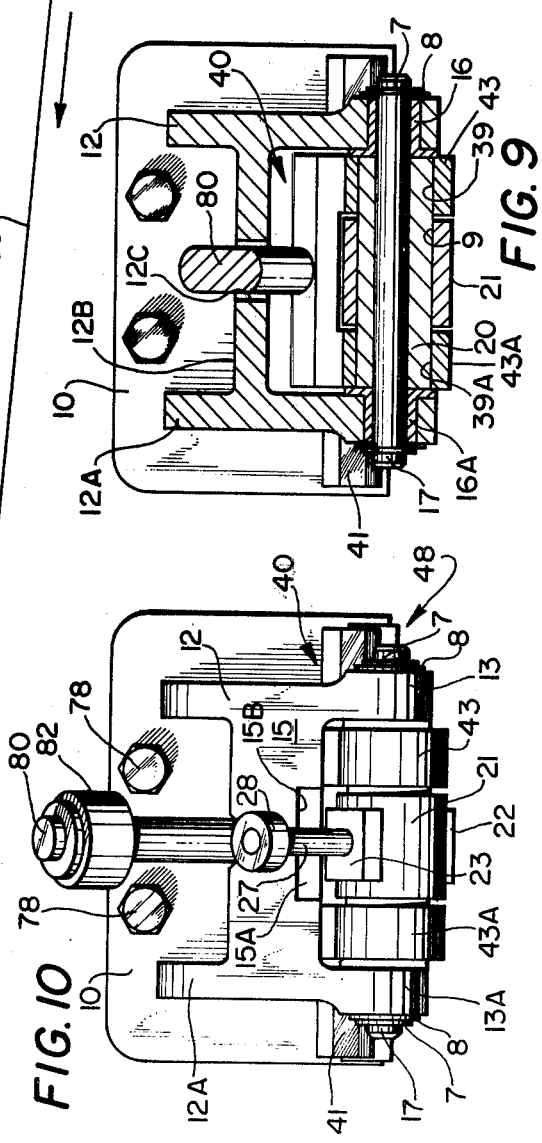

TENTERING CLIP

STATEMENT OF INVENTION

This invention relates to a gate type tentering clip and more particularly to a new and novel mechanical movement of the jaw whereby the selvage edge of plastic film lying behind the jaw, when the jaw is in closed or gripping position, is released from gripping position by a lifting movement of the jaw.

PRIOR ART

Gate type tentering clips have a jaw which pivots around a pintle. The jaw is provided with an upstanding lever which is cam actuated to place the jaw in open position, and pivots to closed or gripping position under the force of gravity.

Plastic film is heat softened and stretched laterally in a tentering machine consisting of two parallel, spaced apart, endless chains comprising a plurality of individual tentering clips pivotally connected together.

During the stretching operation, the film, forward of the jaw and facing the oppositely located jaw, is reduced in thickness. The film lying behind the jaw unaffected by the stretching operation remains 3 to 10 times thicker and stiffer than the stretched film. This is a selvage. At the exit or delivery end of the machine, the pivotally mounted jaw is cam operated to swing or pivot to open position. As the jaw starts to swing backward it pushes the selvage portion of the film backward by engaging the bead made in the film by the stretching operation. Knives sever the stretched sheet from the selvage. The selvage becomes a ribbon of waste material which winds itself into and around parts of the tentering machine while hindering the free swinging movement of the jaw.

OBJECTS OF THE INVENTION

Accordingly, it is a principal object of the present invention to overcome this undesirable condition.

Another object of the present invention is to provide a gate type tentering clip jaw with a new and novel movement in moving from open to closed position and from closed to open position.

Still another object of the present invention is to place a tentering clip jaw in position to be artificially cooled during the non-gripping cycle.

A further object of the present invention is to increase the life of the gripping jaw edge and base plate and to increase the speed at which the gripping jaw edge moves into and out of gripping position.

An additional object of the present invention is to place the gripping jaw edge in a position to be cleaned during the non-gripping cycle and to make replacement of the gripping jaw edge readily available.

Other objects of the present invention will become apparent in part and be pointed out in part in the following specification and claims.

BRIEF DESCRIPTION OF DRAWINGS

Referring to the drawings in which similar reference characters refer to the same parts:

FIG. 1 is a front elevational view of the new and improved tentering clip;

FIG. 2 is a medial vertical sectional view taken on line 2—2 of FIG. 1;

FIG. 3 is a rear elevational view;

FIG. 4 is a right side elevational view;

FIG. 5 is a view similar to FIG. 2, showing the gripping jaw edge in gripping engagement with the base plate;

FIG. 6 shows the gripping jaw edge in material release position under the influence of the longer cam arm;

FIG. 7 shows the gripping jaw edge in an upward elevated position, away from the base plate, under the influence of the shorter cam arm;

FIG. 8 shows the gripping jaw edge in material receiving position, under the influence of both the longer and shorter cam arms.

FIG. 9 is a horizontal cross sectional view taken on line 9—9 of FIG. 2;

FIG. 10 is a plan view of FIG. 1.

FIG. 11 is a diagrammatic view of a tentering machine, showing the location of the cams which operate the jaw lifting housing arm and the jaw projection;

FIG. 12 illustrates the cam and cam follower for the gate lifting housing arm;

FIG. 13 illustrates the cam and cam follower for the jaw lifting housing arm;

FIG. 14 is a perspective view of a tentering clip jaw having a knife edge;

FIG. 14A is a fragmentary view similar in part to FIG. 2, showing a knife edge as an integral part of the gate;

FIG. 15 is a fragmentary view, similar to FIG. 2, showing a tentering clip jaw as an integral part of the gate;

FIG. 16 is a fragmentary view of the jaw projection showing the cam follower as an integral part of said jaw projection;

FIG. 17 is a fragmentary view similar in part to FIG. 2, showing the base as an integral part of the shelf.

Referring to the drawings, the new and improved tentering clip comprises a base or horizontally disposed shelf 10, provided with a horizontal clamp surface 11, a pair of parallel upstanding spaced apart arms 12, 12A which at the upper extremity overlie said horizontal clamp surface 11, and are provided, respectively, with bosses 13, 13A. A reinforcing web 12B, projecting upwardly from base 10, attaches to arms 12, 12A and is provided with a slot 12C. A cross bar 15 is integrally connected to web 12B and arms 12, 12A and is provided with a recess 15A having a stop surface 15B.

Bosses 13, 13A are provided, respectively, with bearing liners 16, 16A (see FIG. 9). A pintle 17 is rotatably mounted on opposite ends in bearing lners 16, 16A and retained therein by means of a washer 8 and spring retainer 7. An eccentric sleeve 20 having a high point 20A and a low point 20B, is rotatably mounted upon pintle 17. A jaw lifting housing 21, generally round in shape, is provided with a stop 22 and a boss 23 having an orifice 24 provided with a threaded area 25 and a stop abutment 25A (see all Figures). Housing 21 is provided with a centrally located bearing 26 adapted to accommodate eccentric sleeve 20. A jaw lifting housing arm 27, provided with a cam follower end 28, a threaded area 30 terminating in a nipple end 31, is fastened to jaw lifting housing 21 through the engagement of threaded areas 25, 30 with nipple end 31 (see FIG. 7) passing through an orifice 32 located in eccentric sleeve 20 and seated against pintle 17. In this manner, jaw lifting housing 21 is fastened to both eccentric sleeve 20 and pintle 17, so that cam actuation of jaw lifting housing arm 27 pivots pintle 17 in bearing liners 16, 16A.

Stop 22 abutting cross bar 15 (see FIG. 8) limits pivotal movement of housing 21.

The tenter clip gate, generally indicated by reference numeral 40, comprises a body 41 having a cut out surface 42 to provide two parallel vertical upstanding spaced apart legs 43, 43A at the top of the body 41. Bearings 39, 39A formed in said spaced apart legs 43, 43A, respectively, are mounted upon said eccentric sleeve. A threaded boss 46 is integrally formed in body 41. A generally vertical slot 47 is provided in the bottom section of said body 41. A tentering clip jaw, generally indicated by reference numeral 48, comprises a bottom or knife edge 49 (FIGS. 14, 14A) or shoe 50 and an upwardly projecting bracket or rib 51. A cap screw 52 provide with a nut 53 and a lock washer 54 pivotally connects bracket 51 located in slot 47 to body 41. (See FIG. 2) However, tentering clip jaw 48 may be an integral part of tenter clip gate 40 and not pivot as shown in FIGS. 14A and 15.

A jaw projection 80 provided with a screw thread 81 and a cam follower 82 is fastened to threaded boss 46 by means of screw thread 81 to become an integral part of tenter clip gate 40. Cam follower 82 is shown rotatably mounted to a bushing 83 fastened to projection 80 by means of washers 84, 84A and spring lock washers 85, 85A (see FIG. 2). Cam follower 82 may be an integral nonrotating part of projection 80 as shown in FIG. 16.

A base element, generally indicated by reference character 60 (see FIG. 2) comprises a body in the form of a "C" provided with a vertical wall 61 having a rail engaging face 62 and an upper arm 63 and a parallel lower arm 64. A roller chain connected on either side to base element 60 comprises roller links 65, 65A and 66, 66A secured to spacing sleeves 67, 67A, 68, 68A, respectively. Rollers 70, 71 are placed respectively, between spacing sleeves 67, 67A and 68, 68A. Pintles (not shown) pivotally connect roller 70, spacing sleeves 67, 67A and roller links 65, 65A to upper arm 63 and lower arm 64. Similarly, pintles (not shown) pivotally connect roller 71, spacing sleeves 68, 68A and roller links 66, 66A to upper 63 and lower 64 arms, respectively.

Horizontally disposed base or shelf 10 is provided with an edge 79. Shelf 10 is positioned upon upper arm 63 with edge 79 abutting face 62. Screws 78 pass through orifices located in horizontally disposed shelf 10 to rotatively engage screw threads (not shown) located in upper arm 63 and therby hold down and attach tenter clip 10 to base element 60. Base element 60 may be an integral part of shelf 10 as shown in FIG. 17.

Reference is made to FIG. 11 wherein is depicted a diagrammatic view of a tentering machine provided with the present invention.

The conventional tentering machine is provided with four sprockets 100, 101, 102, 103. Each sprocket is mounted, respectively, upon a shaft, 104, 105, 106, 107. A plurality of pivotally connected tentering clips form an endless chain 108. Similarly, a plurality of pivotally connected tentering clips form an endless chain 109. Chain 108 is mounted for movement upon sprockets 100, 101. Chain 109 is mounted for movement upon sprockets 102, 103.

An entering end jaw lowering housing cam 110 and an entering end tenter clip gate cam 111 are fastened to the conventional tentering machine frame. An exit end jaw lifting housing cam 110A and an exit end tenter clip gate cam 111A are fastened to the conventional tentering machine frame. Both sets of cams, entering end and exit end, are in operational position to actuate the, respective, cam followers on the tentering clips forming endless chain 108.

In like manner cams 110, 111 and 110A, 111A are provided on the tentering machine frame for endless chain 108.

In operation, the tentering clips forming two endless chains 108, 109, will arrive at the entering end of the tentering machine (first zone) with the bottom edge or shoe 50 in position above and out of vertical alignment with clamp surface 11 (see FIG. 8).

As the tentering chain 108 rounds the sprocket 100, in the direction of arrow A, the clips are in the position shown in FIG. 8. The clip is about to be placed in working position from the non-working position. As the rotating chain passes cam 111, cam follower 82 engages cam 111 to lift projection 80 upwardly to top position placing shoe 50 in vertical alignment with clamp surface 11 as shown in FIG. 7. In sequence, cam follower 28 engages cam 110 to rotate jaw lifting housing arm 27 upwardly and eccentric sleeve 20 from high point 20A to low point 20B, so that stop abutment 25A engages stop surface 15B, placing tentering clip jaw 48 (downwardly) in spaced relation with clamp surface 11 as shown in FIG. 6. Continued rotation of the chain causes cam follower 82 to disengage cam 111 so that tentering clip jaw 48 falls with the force of gravity into clamping position; with shoe 50 against clamp surface 11, as shown in FIG. 5. This same sequence of movements simultaneously occur in the clips of chain 109 so that a web is gripped on opposite edges by the clips in chains 108, 109 and carried through the tentering machine to the exit end.

As the clips in chain 108, 109 approach cams 110A and 111A, (second zone) cam follower 82 engages cam 111A rotating lift projection 80 downwardly to the position shown in FIG. 8, thereby pivoting or swinging shoe 50 out of clamping position with clamp surface 11. Simultaneously, cam follower 28 engages cam 110A to rotate eccentric sleeve 20 from low point 20B to high point 20A. Tenter clip gate 40 is then in the position shown in FIG. 8, where knife edge or shoe 50 may be artificially cooled or naturally cools during the non-working travel of the clip from the exit to entering end of the tentering machine, to complete the cycle just described.

Having shown and described a preferred embodiment of the present invention by way of example, it should be realized that structural changes could be made and other examples given without departing from either the spirit or scope of this invention.

What I claim is:

1. A tentering clip comprising a base provided with a clamp surface, a pair of arms, a cross bar having a stop surface between said pair of arms, an eccentric sleeve, having a high point and a low point, pivotally mounted between said pair of arms, a jaw lifting housing, having a jaw lifting housing arm provided with a cam follower end, a stop and a stop abutment, mounted upon and secured to said eccentric sleeve, a tenter clip gate consisting of a body having a bottom edge, and a projection having a cam follower, and means pivotally mounting said tenter clip gate to said eccentric sleeve, whereby with said stop abutment against said stop surface and said bottom edge against said clamp surface, said bottom edge lies in clamping engagement under the force of gravity, in sequence, pivotal movement of said cam follower upwardly with said projection against said cross bar, pivots said bottom edge rearwardly and upwardly to release the clamping action between said bottom edge and said clamp surface, in a first release position, then cam follower end pivots forwardly from a position where said stop abutment engages said stop surface, to a position where said stop engages said cross bar, thereby lifting bottom edge upwardly and forward of the first release position to a second release position, said cam follower then drops under the force of gravity to pivot said bottom edge forward of said clamp surface to a third release position, movement of said projection upwardly against said cross bar pivots said bottom edge in alignment over said clamp surface, thereafter, rotational movement of said jaw lifting housing arm, to a position where said stop abutment engages said stop surface, lowers said bottom edge toward said clamp surface in first release position, the dropping of said projection under the force of gravity and away from said cross bar places bottom edge in clamping position against said clamp surface.

2. A tentering clip comprising a base provided with a clamp surface, a pair of arms, provided with bearings overlying said clamp surface, a cross bar between said pair of arms having a stop surface, a pintle mounted in said bearings, an eccentric sleeve, having a high point and a low point, mounted upon said pintle, a jaw lifting housing provided with a centrally located bearing, and a stop and a stop abutment, mounted upon said eccentric sleeve, a jaw lifting housing arm, provided with a cam follower end, projecting from said jaw lifting housing, means securing said jaw lifting housing and said eccentric sleeve to said pintle, a tenter clip gate consisting of a body having a cut out to provide two spaced apart legs at the top of said body, and a rib with a bottom edge at the bottom of said body, bearings formed in said spaced apart legs, mounted upon said eccentric sleeve for independent pivotal movement, a jaw projection, provided with a cam follower, projecting from said tentering clip gate whereby with said stop abutment against said stop surface and said bottom edge against said clamp surface, said bottom edge lies in clamping engagement under the force of gravity, in sequence, pivotal movement of said cam follower upwardly with said projection against said cross bar, pivots said bottom edge rearwardly and upwardly to release the clamping action between said bottom edge and said clamp surface, in a first release position, then cam follower end pivots forwardly from a position where said stop abutment engages said stop surface, to a position where said stop engages said cross bar, thereby lifting bottom edge upwardly and forward of the first release position to a second release position, said cam follower then drops under the force of gravity to pivot said bottom edge forward of said clamp surface to a third release position, movememt of said projection upwardly against said cross bar pivots said bottom edge in alignment over said clamp surface, thereafter, rotational movement of said jaw lifting housing arm, to a position where said stop abutment engages said stop surface, lowers said bottom edge toward said clamp surface in first release position, the dropping of said projection under the force of gravity and away from said cross bar places bottom edge in clamping position against said clamp surface.

3. A tentering clip comprising a horizontally disposed shelf provided with a clamp surface, a pair of parallel vertical spaced apart arms having bearings overlying said clamp surface, and a reinforcing web, having a slot, and a cross bar provided with a stop surface, attached to said shelf and spaced apart arms, a pintle mounted in said bearings, an eccentric sleeve mounted upon said pintle, a jawlifting housing provided with a centrally located bearing, a boss having a stop abutment and a stop, mounted upon said eccentric sleeve, a jaw lifting housing arm provided with a cam follower end projecting from said jaw lifting housing, means securing said jaw lifting housing and said eccentric sleeve to said pintle, a tenter clip gate consisting of a body having a cut out surface to provide two parallel upstanding spaced apart legs at the top of said body, and a horizontal rib, provided with slot at the bottom portion of said body, bearings formed in said spaced apart legs, mounted upon said eccentric sleeve, a tentering clip jaw provided with a bottom edge and a bracket, screw means fastening said bracket located in said slot to said rib, a jaw projection provided with a cam follower projecting from said tentering clip gate, whereby with said stop abutment against said stop surface and said bottom edge against said clamp surface, said bottom edge lies in clamping engagement under the force of gravity, in sequence, pivotal movement of said cam follower upwardly with said projection against said cross bar, pivots said bottom edge rearwardly and upwardly to release the clamping action between said bottom edge and said clamp surface, in a first release position, then cam follower end pivots forwardly from a position where said stop abutment engages said stop surface, to a position where said stop engages said cross bar, thereby lifting bottom edge upwardly and forward of the first release position to a second release position, said cam follower then drops under the force of gravity to pivot said bottom edge forward of said clamp surface to a third release position, movement of said projection upwardly against said cross bar pivots said bottom edge in alignment over said clamp surface, thereafter, rotational movement of said jaw lifting housing arm, to a position where said stop abutment engages said stop surface, lowers said bottom edge toward said clamp surface in first release position, the dropping of said projection under the force of gravity and away from said cross bar places bottom edge in clamping position against said clamp surface.

* * * * *